(12) United States Patent
Shin et al.

(10) Patent No.: US 9,697,918 B2
(45) Date of Patent: Jul. 4, 2017

(54) APPARATUS AND METHOD FOR AUTOMATICALLY LOADING A FUEL PELLET FOR MANUFACTURING A NUCLEAR FUEL ROD

(71) Applicant: KEPCO NUCLEAR FUEL CO., LTD., Daejeon (KR)

(72) Inventors: Se Yong Shin, Chungcheongbuk-do (KR); Chang Hwan Hwang, Daejeon (KR); Hung Soon Chang, Daejeon (KR); Tae Hyung Na, Daejeon (KR); Bong Sik Moon, Daejeon (KR); Young Seok Yoon, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 0 days.

(21) Appl. No.: 15/146,261

(22) Filed: May 4, 2016

(65) Prior Publication Data
US 2016/0307654 A1    Oct. 20, 2016

Related U.S. Application Data

(62) Division of application No. 13/733,358, filed on Jan. 3, 2013.

(30) Foreign Application Priority Data

Jan. 4, 2012  (KR) .................... 10-2012-0001206

(51) Int. Cl.
*B23P 21/00* (2006.01)
*B23Q 17/00* (2006.01)
(Continued)

(52) U.S. Cl.
CPC .............. *G21C 21/02* (2013.01); *G01B 11/02* (2013.01); *G21Y 2002/302* (2013.01);
(Continued)

(58) Field of Classification Search
CPC ........ G21C 21/02; G21C 19/207; G21C 3/33; G21C 3/30; G21Y 2004/401;
(Continued)

(56) References Cited

U.S. PATENT DOCUMENTS 3,897,673 A    8/1975  Kee et al.
3,940,908 A    3/1976  Dazen et al.
(Continued)

FOREIGN PATENT DOCUMENTS

JP    2000-019291 A    1/2000
KR   10-2007-0103754 A  10/2007

*Primary Examiner* — Sarang Afzali
*Assistant Examiner* — Darrell C Ford
(74) *Attorney, Agent, or Firm* — Rabin & Berdo, P.C.

(57) ABSTRACT

A method for loading fuel pellets for manufacturing a nuclear fuel rod is provided. The method includes arranging fuel pellets in a row on a tray, aligning the fuel pellets in the row on the tray such that the fuel pellets are closely in contact with one another, obtaining a total length of the pellets in the row by measuring the fuel pellets in the row on the tray, and comparing the total length with a predetermined length. When the total length is smaller than the predetermined length by a difference greater than an average unit length of the pellet, one or more fuel pellets are added in the row until to increase the total length until the difference becomes smaller than the average unit length of the fuel pellet.

6 Claims, 11 Drawing Sheets

(51) Int. Cl.
  *B23Q 15/00* (2006.01)
  *G21C 21/02* (2006.01)
  *G01B 11/02* (2006.01)
  B23P 19/00 (2006.01)

(52) U.S. Cl.
  CPC ..... *G21Y 2004/401* (2013.01); *Y10S 294/906* (2013.01); *Y10T 29/49771* (2015.01); *Y10T 29/531* (2015.01); *Y10T 29/53039* (2015.01); *Y10T 29/53048* (2015.01); *Y10T 29/53061* (2015.01); *Y10T 29/53539* (2015.01)

(58) Field of Classification Search
  CPC ........... G21Y 2002/302; Y10S 294/906; Y10S 294/907; B23P 2700/00; B23P 19/04; B23P 19/10; Y10T 29/53039; Y10T 29/53048; Y10T 29/53061; Y10T 29/531; Y10T 29/53539; Y10T 29/49771
  USPC .... 29/723, 407.05, 906, 709, 711, 712, 714, 29/822
  See application file for complete search history.

(56) References Cited

U.S. PATENT DOCUMENTS

| | | | |
|---|---|---|---|
| 3,965,648 A | 6/1976 | Tedesco | |
| 4,158,601 A | 6/1979 | Gerkey | |
| 4,193,502 A | 3/1980 | Marmo | |
| 4,292,788 A | 10/1981 | King | |
| 4,349,112 A | 9/1982 | Wilks et al. | |
| 4,549,662 A | 10/1985 | Schoeing et al. | |
| 4,643,867 A | 2/1987 | Hornak et al. | |
| 4,748,798 A * | 6/1988 | Udaka .................. | G21C 21/02 29/723 |
| 4,897,858 A * | 1/1990 | Rieben .................. | G21C 21/02 376/261 |
| 4,918,991 A | 4/1990 | Bucher et al. | |
| 4,980,119 A * | 12/1990 | Schoenig, Jr. ......... | G21C 21/02 376/261 |
| 5,024,574 A | 6/1991 | Wilson et al. | |
| 5,043,133 A * | 8/1991 | Lambert ................ | G21C 3/334 376/261 |
| 5,251,244 A | 10/1993 | Wazybok et al. | |
| 5,323,433 A * | 6/1994 | Yaginuma .............. | G21C 21/02 34/109 |
| 5,489,184 A | 2/1996 | Huggins | |
| 5,509,039 A | 4/1996 | Fogg | |
| 5,754,611 A | 5/1998 | Petit | |
| 6,639,961 B2 * | 10/2003 | Bailey .................... | G21C 21/02 198/453 |
| 2003/0103593 A1 | 6/2003 | Bailey et al. | |
| 2004/0196952 A1 | 10/2004 | Helmersson | |
| 2006/0146974 A1* | 7/2006 | Crawford ............... | G21C 17/06 376/261 |
| 2006/0285626 A1* | 12/2006 | Bailey .................... | G21C 21/02 376/261 |
| 2009/0034675 A1 | 2/2009 | Hamasaki et al. | |
| 2009/0103110 A1 | 4/2009 | Ferlet | |
| 2012/0118702 A1 | 5/2012 | Janning | |
| 2014/0072389 A1 | 3/2014 | Shin et al. | |

* cited by examiner

APPARATUS AND METHOD FOR AUTOMATICALLY LOADING A FUEL PELLET FOR MANUFACTURING A NUCLEAR FUEL ROD

CROSS-REFERENCE RELATED APPLICATIONS

This application is a divisional application of co-pending U.S. application Ser. No. 13/733,358, filed Jan. 3, 2013, the disclosure of which is incorporated herein by reference. This application claims priority benefits under 35 U.S.C. §1.119 to Korean Patent Application No. 10-2012-0001206 filed Jan. 4, 2012.

BACKGROUND OF THE INVENTION

1. Field of the Invention

The present invention relates to an apparatus and a method for automatically loading a fuel pellet for manufacturing a nuclear fuel rod, and more particularly, to an apparatus and a method for automatically loading a fuel pellet for manufacturing a nuclear fuel rod by automatically calculating a required number of fuel pellets according to a length of a cladding tube.

2. Description of the Related Art

A nuclear reactor is an apparatus for artificially controlling a fission chain reaction of a fissile material to use thermal energy generated during a fission reaction as power.

Generally, enriched uranium in which a percentage of uranium-235 is increased to 2-5 percentage is used in a light water nuclear reactor and, in order to process the uranium into a nuclear fuel to be used in the nuclear reactor, a molding process is performed on the uranium to produce a cylindrical fuel pellet of about 5 g weight.

The fuel pellet that is molding processed as above is dried in a furnace, charged in a cladding tube that is manufactured in a special alloy of a tube shape having a good corrosion resistance, and sealed to be manufactured as a nuclear fuel rod. The manufactured nuclear fuel rod is composed of a bundled fuel assembly and loaded to a core of the nuclear reactor so that combustion occurs through a nuclear reaction.

Although variations may exist depending on a type of the nuclear fuel, the fuel pellet is typically manufactured into a cylindrical shape having a diameter of approximately 8 mm and a height of approximately 10 mm. Therefore, a nuclear fuel rod having a length of about 4 m may contain about 400 fuel pellets charged therein.

In addition, the fuel assembly consists of approximately several hundred fuel rods, and thus, in order to produce one fuel assembly, tens of thousands of the fuel pellets need to be charged in the cladding tube and manufactured into the nuclear fuel rod.

However, the fuel pellets may have a deviation in length to a certain degree during the molding process, and a length of the cladding tube is significantly greater than a length of a unit pellet. Therefore, due to accumulated variation of the length of the fuel pellet, the number of the fuel pellets that are charged in the cladding tube is not constant but varied.

Therefore, the deviation in length of the fuel pellet generated in a fuel pellet manufacturing process creates difficulty in implementing an automated process for automatically charging the fuel pellet in the cladding tube, and a manual operation is performed to determine a required number of the fuel pellets according to a charging length of the cladding tube.

SUMMARY OF THE INVENTION

Accordingly, the present invention has been made in view of the above problems, and the present invention is to provide an apparatus and a method for automatically loading a required number of fuel pellets in a unit of tray, wherein the required number is automatically calculated according to a fuel pellet charging length of a cladding tube, in a process of automatically charging a fuel pellet for manufacturing a nuclear fuel rod.

In one aspect of the present invention, an apparatus for automatically loading a fuel pellet for manufacturing a nuclear fuel rod includes a tray transfer unit configured to horizontally transfer a tray in which a plurality of fuel pellets are arranged; a fuel pellet alignment unit configured to align the fuel pellets arranged in the tray; a measurement unit configured to measure an entire length of the fuel pellets arranged in a row on the tray; a controller configured to store the length of the fuel pellets measured by the measurement unit, configured to compare a measured length that is accumulated with a set length, and configured to control driving of driving elements; and a waiting table located adjacent to the tray transfer unit to store a redundancy fuel pellet; and a fuel pellet movement unit configured to be driven by the controller and configured to move the fuel pellet between a tray of which length measurement is completed by the measurement unit and the waiting table to increase or decrease the fuel pellet arranged on the tray.

Preferably, the measurement unit may measure a length of a row of the fuel pellets arranged on the tray by obtaining an optical flat image of the tray.

More preferably, the measurement unit may include a camera for obtaining the optical flat image of the tray; and an image signal processing unit provided in the controller to detect the length of the row of the fuel pellets arranged on the tray based on image information from the camera.

Preferably, the fuel pellet transfer unit may include a transfer arm capable of vertical or horizontal movement; and a vacuum nozzle unit fixed to the transfer arm.

Preferably, a tray loading unit configured to stack a tray passing through the measurement unit to be received in a rack may further be included.

In another aspect of the present invention, a method of automatically loading a fuel pellet for manufacturing a nuclear fuel rod, wherein a required number of the fuel pellet to be charged in a cladding tube is calculated according to a charging length and loaded in a unit of tray, the method including: a first step of measuring a length of each row of fuel pellets that are arranged in a plurality of rows in the tray; a second step of accumulating the length of each row of the fuel pallets measured with respect to a plurality of trays that are conveyed along a main convey line and comparing the accumulated length with a set charging length; and a third step of increasing or decreasing the fuel pellet such that a difference between the accumulated length of each row of the fuel pallets and the set charging length of the cladding tube is less than a unit length of the fuel pellet, wherein a row of the fuel pellets on the tray that is increased or decreased are charged in a set cladding tube.

Preferably, the length of the fuel pellet is obtained by measuring a length of a row of the fuel pellets arranged on the tray by obtaining an optical flat image of the tray.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Exemplary embodiments of the present invention will be described herein below with reference to the accompanying drawings.

Figure 1:
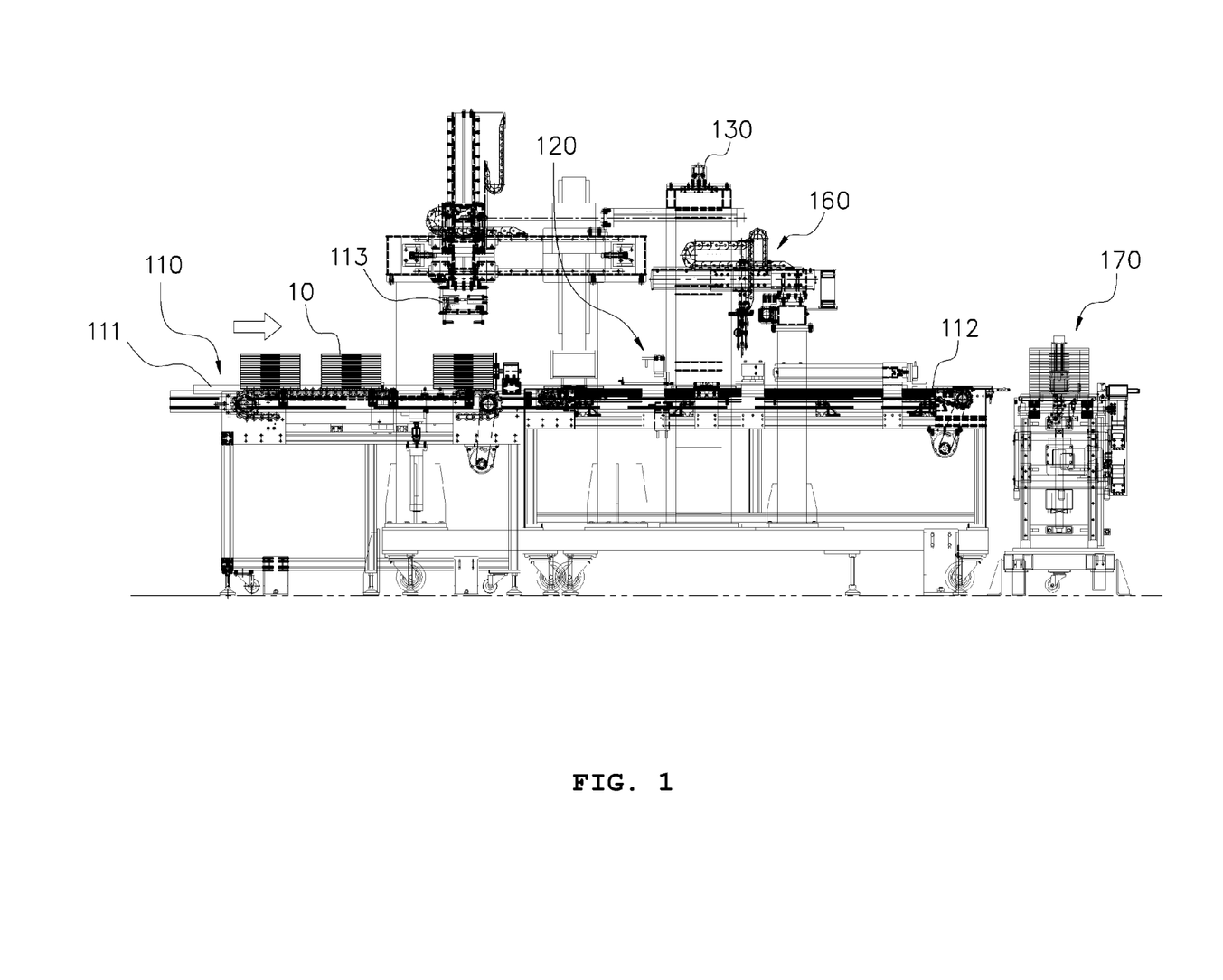
FIG. 1 is a front view illustrating an apparatus for automatically loading a fuel pellet for manufacturing a nuclear fuel rod according to the present invention.
Figure 2:
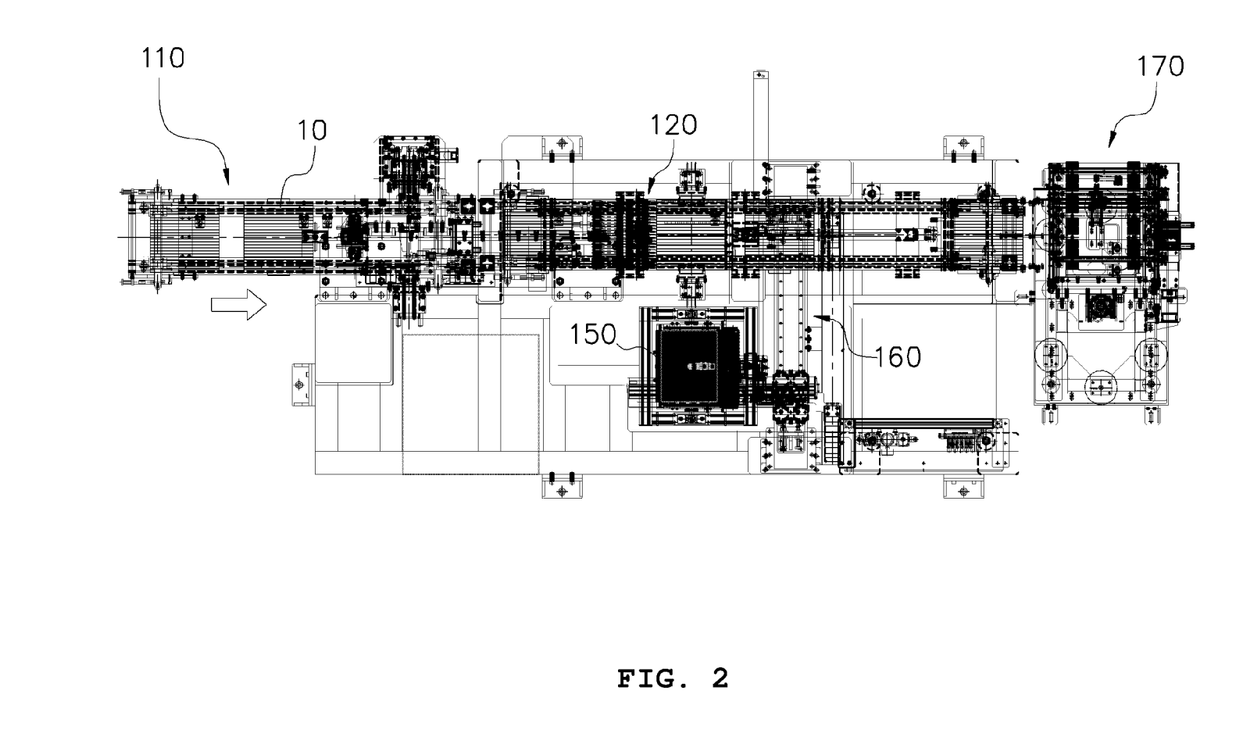
FIG. 2 is a plan view illustrating an apparatus for automatically loading a fuel pellet for manufacturing a nuclear fuel rod according to the present invention.

Referring to FIGS. 1 and 2, an apparatus for automatically loading a fuel pellet for manufacturing a nuclear fuel rod includes a tray transfer unit 110 which horizontally transfers a tray in which a fuel pellet is arranged, a fuel pellet alignment unit 120 for aligning the fuel pellet arranged in the tray, a measurement unit 130 for measuring a length of the fuel pellet arranged in the tray, a controller 140 that controls driving elements and processes fuel pellet length information transmitted from the measurement unit 130, a waiting table 150 in which redundancy fuel pellets are arranged, and a fuel pellet movement unit 160 for moving the fuel pellet between the tray that travels along a main transfer line and the waiting table 150, thereby increasing or decreasing the fuel pellet on the tray.

In the apparatus for automatically loading the fuel pellet according to the present invention, fuel pellets are arranged on a tray 10 to be processed in a unit of tray.

Figure 3:
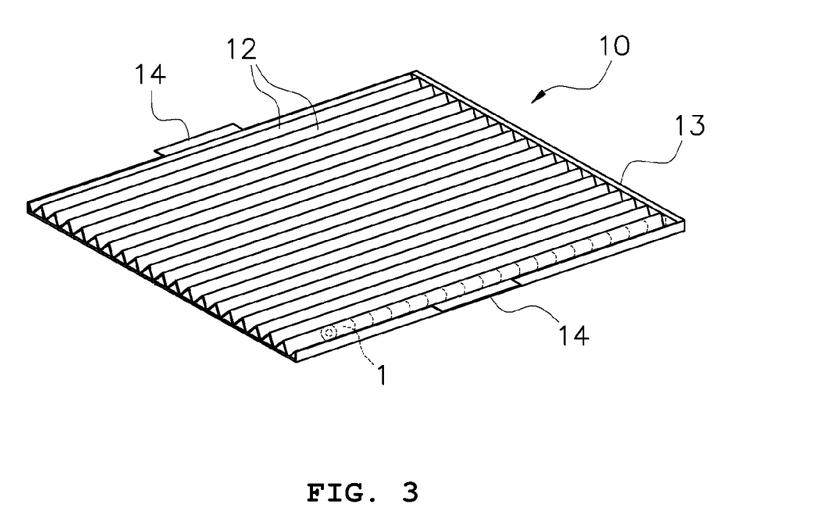
FIG. 3 is a view illustrating a fuel pellet tray in which a fuel pellet is received according to the invention.

Specifically, as shown in FIG. 3, the tray 10 is divided into a plurality of barrier ribs 12 arranged in parallel to each other on a rectangular plate 10, each of which has a cross section of a triangle shape, and the fuel pellet is arranged in a row between the barrier ribs 12.

A fixing plate 13 is fixed at a rear end of the barrier rib 12, and therefore, the fuel pellet 1 arranged along the barrier rib 12 can be supported by the fixing plate 13.

The fuel pellet 1 provided in the tray 10 can later be directly charged from the try 10 to a cladding tube in a unit of tray in a cladding tube charging process.

In addition, the fuel pellet 1 arranged in the tray 10 is arranged in a row divided by the barrier ribs 12 and the number of rows of the fuel pellet arranged on the tray 10 is preferably the same as the number of the fuel pellets that are charged in the cladding tube at one time in a process of charging the fuel pellet in the cladding tube, which will be described in detail later.

A reference number 14 refers to a gripping unit for handling the tray 10 during a process.

The transfer unit 110 is the main transfer line in which the tray 10 is horizontally transferred and the transfer unit 110 may be provided by, for example, as a well known conveyor. In the exemplary embodiment, the transfer unit 110 may include a queue transfer unit 111 to stack and horizontally transfer the tray 10 in which the fuel pellet is received and a main transfer unit 112 to transfer, one by one, the tray 10 that is stacked and transferred to the queue transfer unit 111 to a next measurement process.

The queue transfer unit 111 may further include a robot arm 113 (is the robot arm included in the queue transfer unit?) for moving, one by one, the trays 10 that are stacked and transferred to the next main transfer unit 112. An operation of the robot arm 113 may be controlled by the controller 140, which is described below. (A frame along which the robot arm is moving should be described)

It should be noted that the queue transfer unit 111 of the transfer unit 110 may be variously modified considering, for example, an arrangement of a process line or work efficiency.

The fuel pellet alignment unit 120 is used to precisely align the fuel pellet 1, which is arranged on the tray 10, prior to measuring the length of the fuel pellet. The fuel pellet alignment unit 120 may be provided as a plurality of alignment cylinders 121 having a cylinder load 121a positioned at one end of the tray 10 and capable of moving upward and downward and forward and backward.

Figure 4:
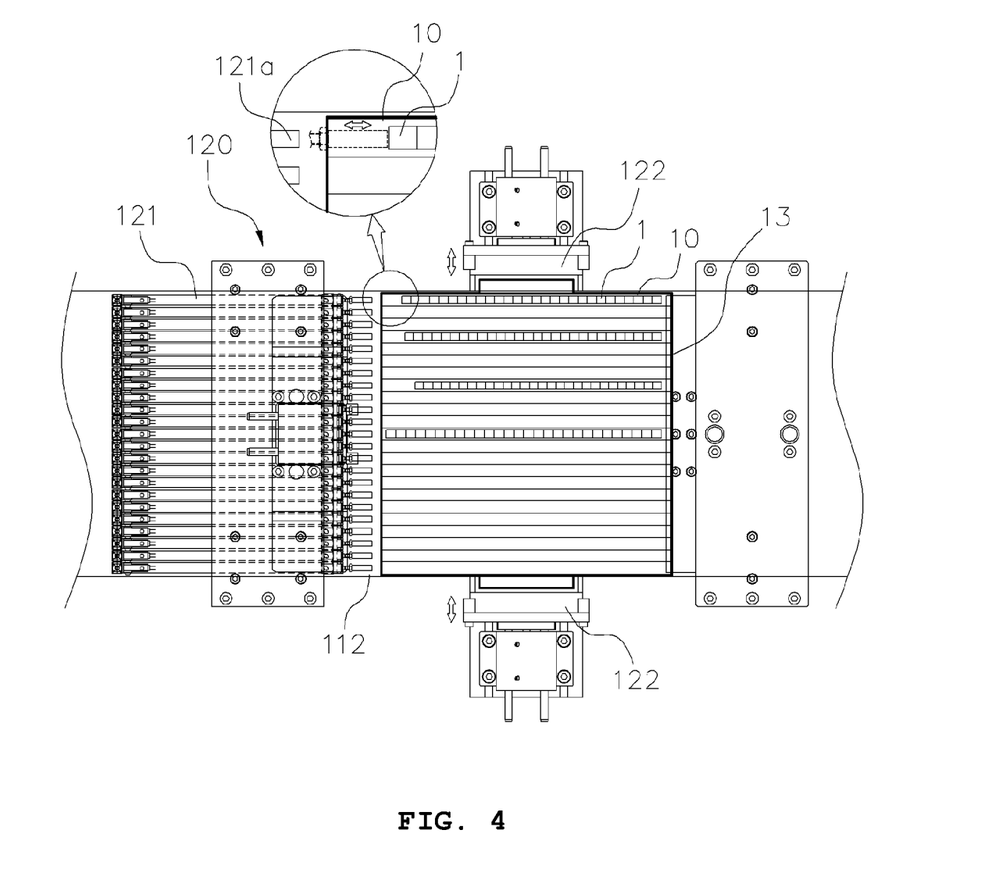
FIG. 4 is a plan view illustrating a fuel pellet alignment unit in an apparatus for automatically loading a fuel pellet according to the present invention.
Figure 5:
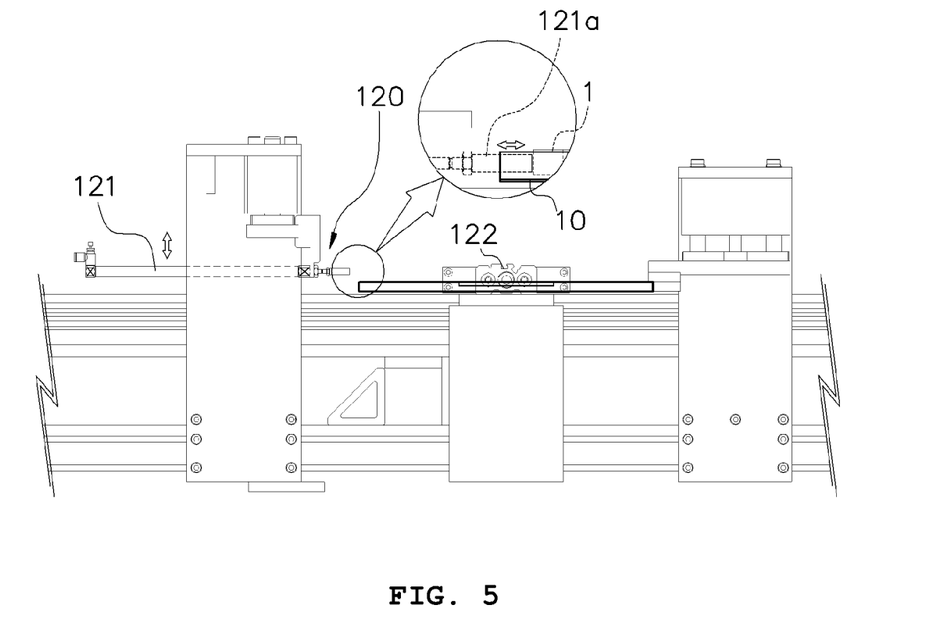
FIG. 5 is a front view illustrating a fuel pellet alignment unit in an apparatus for automatically loading a fuel pellet according to the present invention.

Referring to FIGS. 4 and 5, the alignment cylinders 121 are fixedly positioned on each bracket to be parallel to one another and capable of vertical movement, and each alignment cylinder 121 has the cylinder load 121a capable of moving forward and backward by using each driving source and having a damper.

When the tray 10 is stopped at a predetermined location on the main transfer unit 112, the cylinder load 121a of the fuel pellet alignment unit 120 presses one end of the fuel pellet 1 arranged on the tray 10 such that the fuel pellets 1 arranged on the tray 10 are closely positioned on the fixing plate 13 and aligned with respect to a right side.

After the fuel pellet 1 is aligned by a forward movement of the cylinder load 121a, the alignment cylinder 121 moves upward so that the alignment cylinder 121 does not interfere with the next tray 10 that is transferred.

Also, a fixing clamp 122 may be preferably provided on both ends of the transfer line of the main transfer unit 112 to fix the tray 10, and the fixing clamp 122 performs to fix the tray 10 during an alignment process and a subsequent measurement process.

The fixing clamp 122 may be provided by a well known hydraulic or pneumatic cylinder and may be controlled by the controller 140 together with the fuel pellet alignment unit 120.

The measurement unit 130 is used to measure an entire length of the fuel pellets 1 arranged in a row on the tray 10. In the present invention, the measurement unit 130 may be provided in a camera 131 positioned above the fuel pellet alignment unit 120 to obtain an optical flat image of the tray 10.

The camera 131 is fixedly installed in a frame 132 positioned at a predetermined height above the fuel pellet alignment unit 120. Image information obtained by the camera 131 is transmitted to the controller 140 and the controller 140 processes the image information to calculate the length of a row of the fuel pellet arranged on the tray 10.

Figure 7:
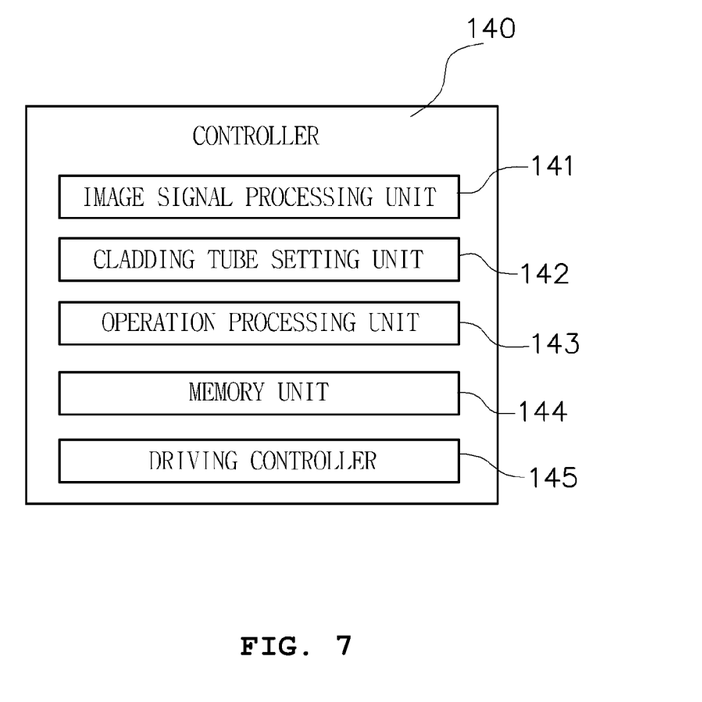
FIG. 7 is a view illustrating a preferable example of a controller in an apparatus for automatically loading a fuel pellet according to the present invention.

Referring to FIG. 7, the controller 140 may include an image signal processing unit 141 for processing an image signal transmitted from the camera, a cladding tube setting unit 142 for setting a cladding tube to which the fuel pellet is charged, an operation processing unit 143 for performing a data operation process, a memory unit 144 for storing a data, and a driving controller 145 for controlling driving of driving elements such as, for example, a motor or the robot arm. Although not specifically described in the present invention, it should be noted that well known sensors may be provided to detect an exact driving position of the driving elements that can be typically in an automated process or control positioning thereof, and information of the sensors may be transmitted to the controller 140 to be used for accurately controlling the driving elements.

Figure 8:
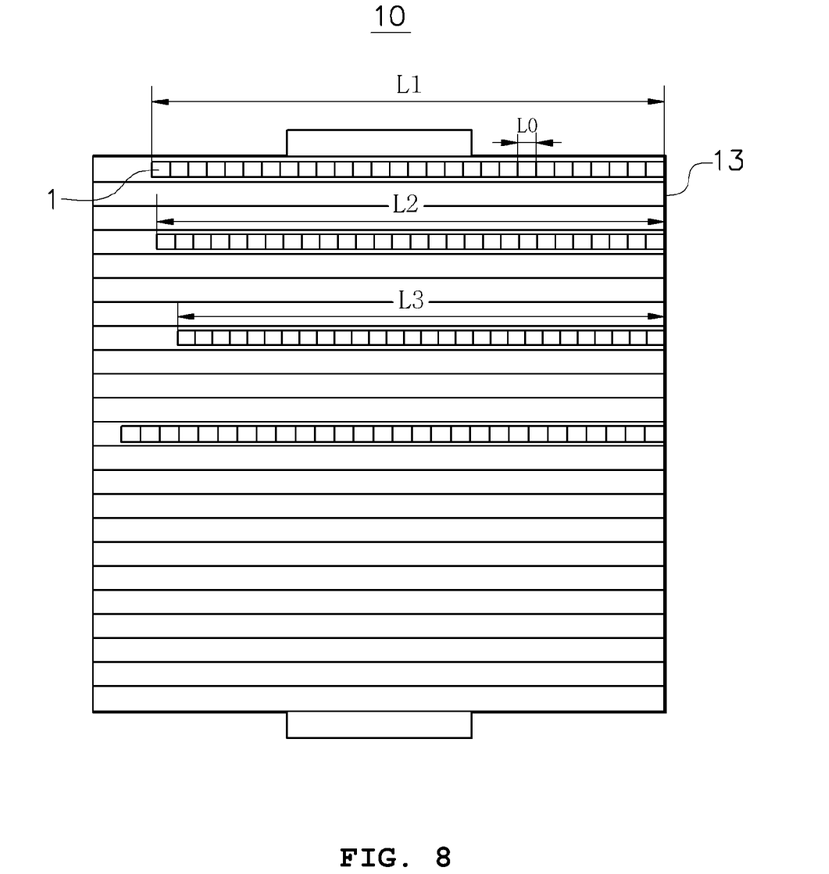
FIG. 8 is a plan view illustrating a tray in which a fuel pellet is received in an apparatus for automatically loading a fuel pellet according to the present invention.

Referring to FIGS. 7 and 8, the fuel pellets 1 are arranged with respect to the fixing plate 13 of the tray 10 in the fuel pellet alignment unit 120 and the camera obtains a flat image of the tray 10.

The image information is transmitted to the image signal processor 141 of the controller 140 and the image signal processor 141 calculates respective lengths L1, L2 and L3 of a fuel pellet row based on the image information, wherein the calculated length is accumulated with respect to a specific row to be compared with a set fuel pellet charging length.

Meanwhile, the cladding tube setting unit 142 is used to set the cladding tube to which the fuel pellet is charged, and the charging length of the fuel pellet is set according to the set cladding tube.

Therefore, the controller 140 calculates the length of the fuel pellet arranged in the tray 10 to accumulate the calculated lengths in a unit of row. Also, the controller 140 compares the accumulated value with the charging length of the cladding tube to calculate the number of the needed fuel pellets to be charged in the cladding tube in a unit of tray so that the fuel pellets as many as needed are received in the tray 10. Thus, the tray 10 that contains the fuel pellets corresponding to the charging length may be stacked in a unit of tray and transferred to a next fuel pellet charging process so that the fuel pellet is charged in the cladding tube.

Figure 9:
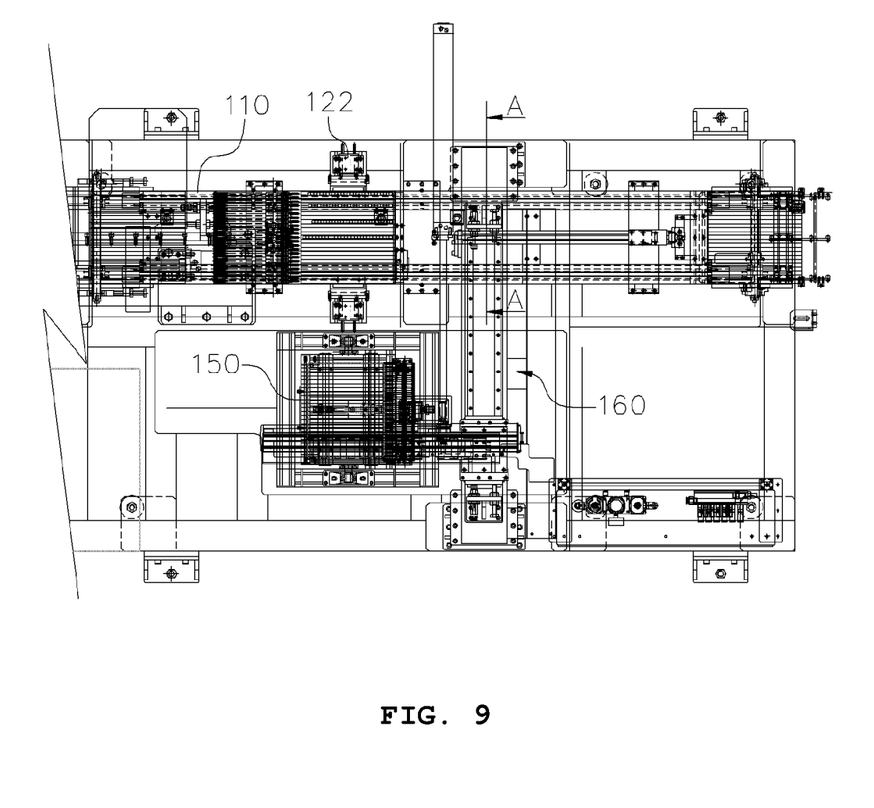
FIG. 9 is a plan view illustrating an arrangement relationship of a fuel pellet waiting table in an apparatus for automatically loading a fuel pellet according to the present invention.
Figure 10:
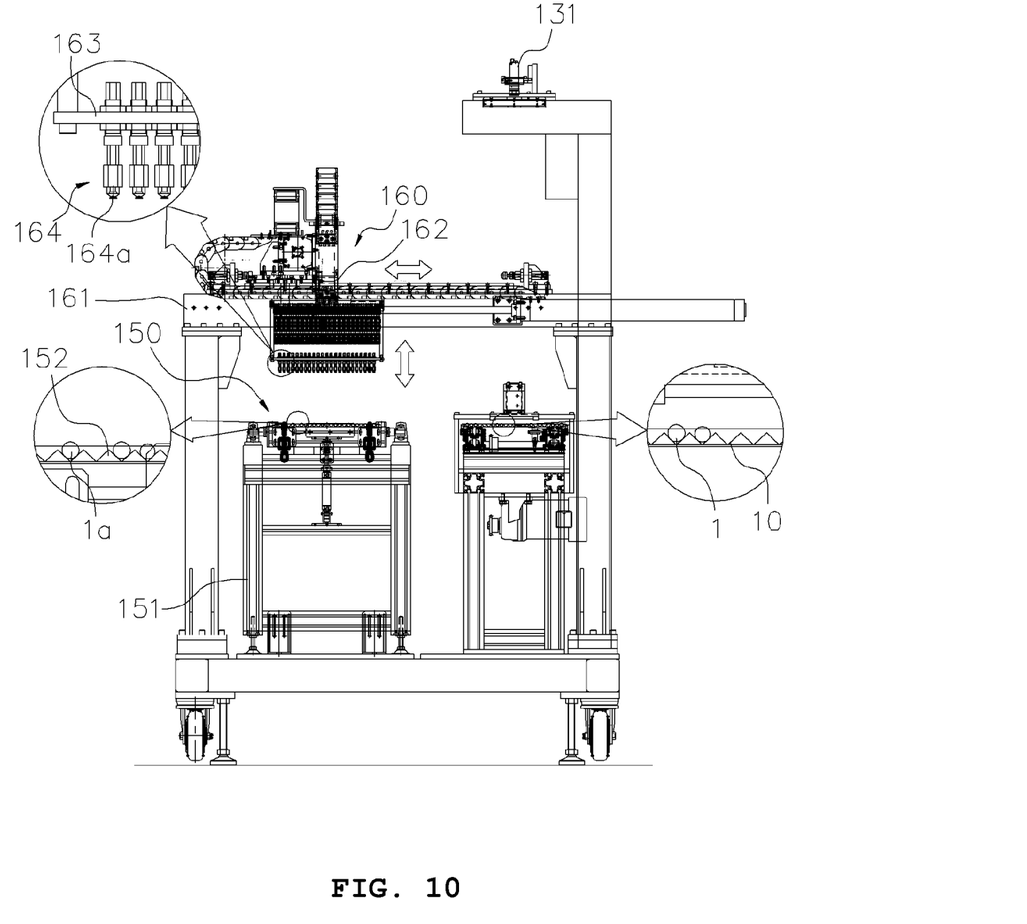
FIG. 10 is a view taken along line A-A of FIG. 9.

Referring to FIGS. 9 and 10, the fuel pellet waiting table 150 is positioned adjacent to the main transfer line of the tray 10 and is preferably positioned immediately adjacent to the main transfer line that obtains the flat image information of the tray through the measurement unit 130.

The fuel pellet waiting table 150 stores redundancy fuel pellets 1a, which are used to supplement or eliminate the fuel pellet when a difference as much as a unit length L0 of the fuel pellet exists when comparing, through the measurement unit 130, the length of the fuel pellet arranged in the tray 10 and the set charging length of the cladding tube.

The fuel pellet waiting table 150 may include a table frame 151 that is fixedly installed at a predetermined height adjacent to the main transfer line and an auxiliary tray 152 that is fixed at an upper portion of the table frame 151, wherein the auxiliary tray 152 may be provided in substantially the same form as the tray 10 that moves along the main transfer line.

The fuel pellet movement unit 160 is used to move the fuel pellet between the tray 10 on the main transfer line and the fuel pellet waiting table 150 and is driven according to the control of the controller 150.

Figure 6:
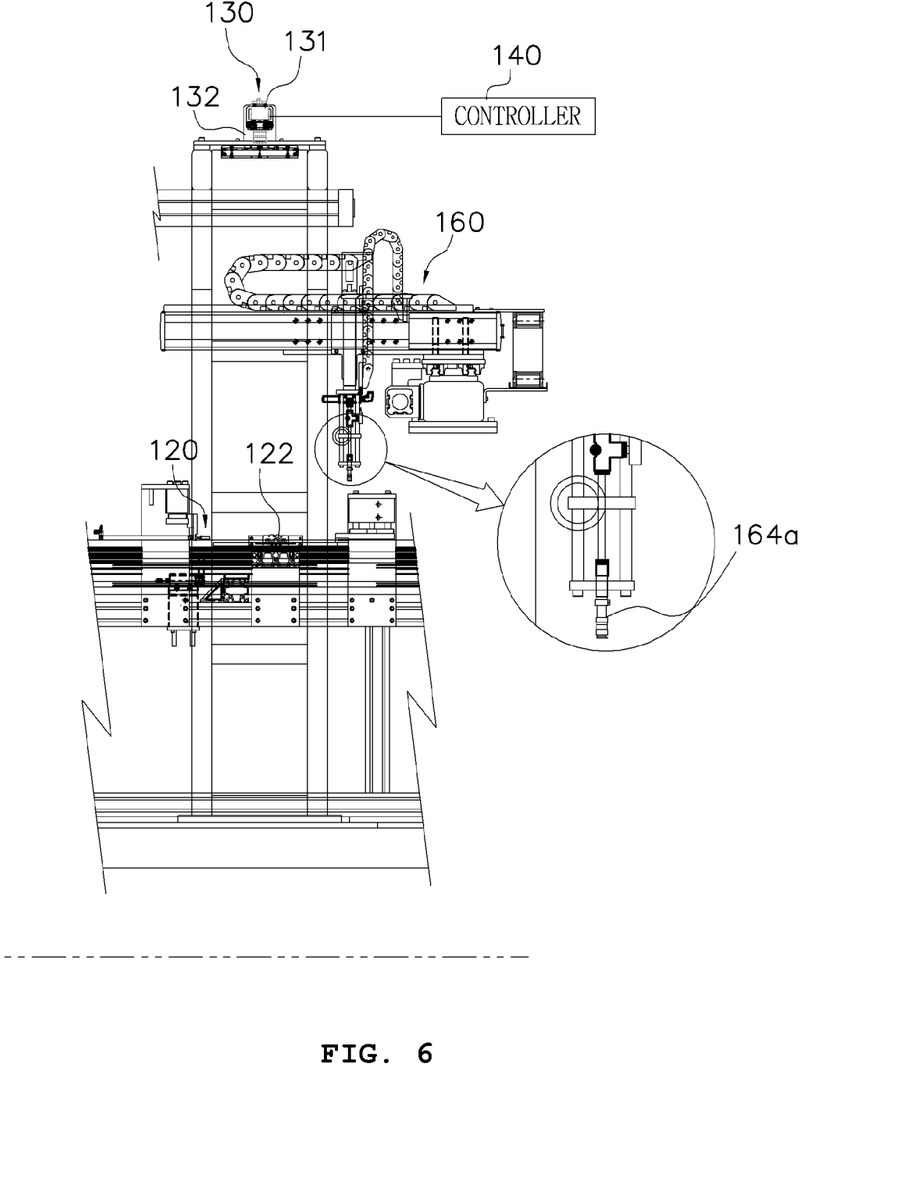
FIG. 6 is a view illustrating a tray transfer unit, a fuel pellet alignment unit, and a fuel pellet transfer unit in an apparatus for automatically loading a fuel pellet according to the present invention.

Specifically, the fuel pellet movement unit 160 may include a guide frame 161 that is vertically installed relative to a body, a robot arm 162 that is supported by the guide frame 161 to be capable of three dimensional movement, i.e., forward and backward, left and right, and upward and downward, and a vacuum nozzle unit 164 of which position is moved by the robot arm 162. The vacuum nozzle unit 164 may be formed in a plurality of vacuum nozzles 164a positioned in a row and may be fixed to the robot arm 162 through a bracket 163 as a medium.

The vacuum nozzle unit 164 is associated with a vacuum pump and fixes the fuel pellet by vacuum generated by a vacuum pump.

In particular, each vacuum nozzle 164a that forms the vacuum nozzle unit 164 is preferably configured to be individually vacuum controlled. More preferably, the number of the vacuum nozzle 164a that forms the vacuum nozzle unit 164 may be the same as the number of row of the fuel pellet on the tray 10, and therefore, a particular row of fuel pellets can be selected among rows of the fuel pellets arranged on the tray 10 to increase or decrease the fuel pellets therein.

Figure 11:
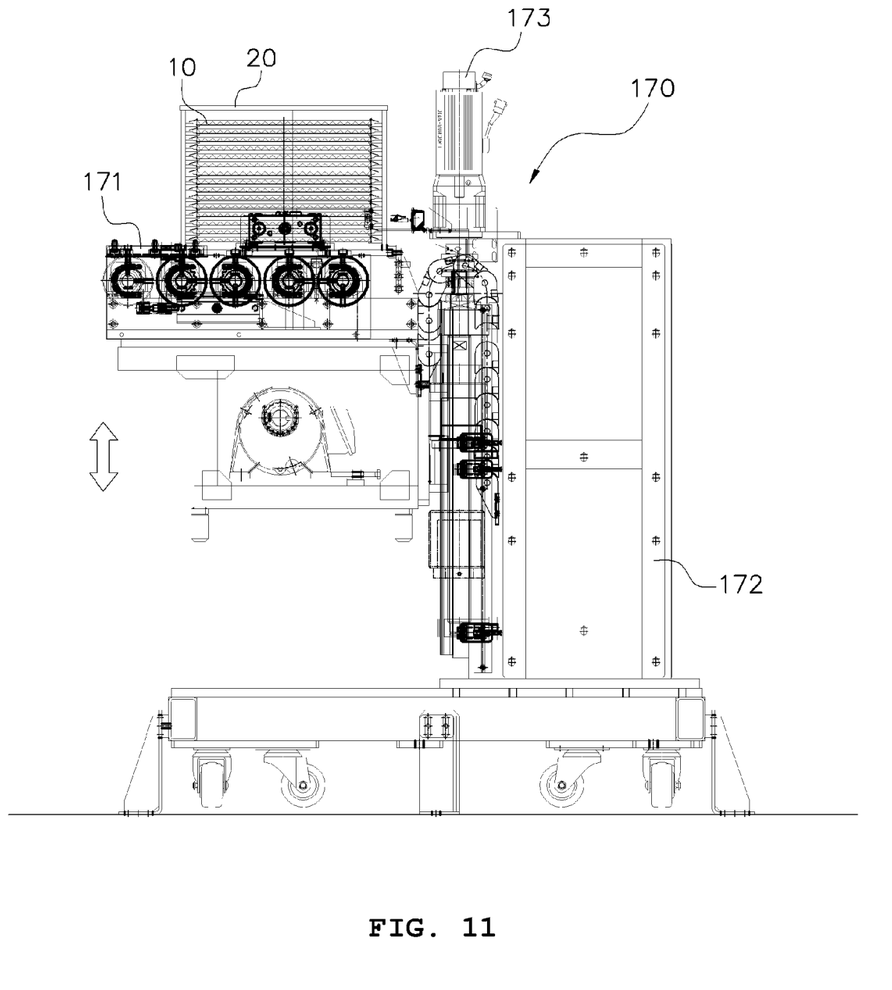
FIG. 11 is a view illustrating a fuel pellet loading unit in an apparatus for automatically loading a fuel pellet according to the present invention.

In the present invention, a tray loading unit 170 is preferably added on a rear end such that the tray 10 passing through the measurement unit 130 is stacked and received in a tray rack.

Referring to FIG. 11, the tray loading unit 170 is provided at a rear end of the main transfer line such that the transferred trays 10 are stacked one by one to be received in a tray rack 20.

Meanwhile, the tray loading unit 170 may include a rack table 171 in which the tray rack 20 is securely placed to sequentially receive the tray 10 and a driving motor 173 that is supported by a base frame 172, which is fixed to the ground, to ascend or descend the rack table 171.

The driving motor 173 is controlled by the controller 140 and controls a height of the rack table 171 such that the tray 10 that is transferred along the main transfer line can be sequentially received in the track rack 20. Thus, the transferred tray 10 is received in the tray rack 20 from bottom to top or vice versa.

The trays 10 stacked and received in the tray rack 20 are passed through a drying process and finally charged in the cladding tube in the cladding tube charging process.

A method of automatically loading a fuel pellet for manufacturing a nuclear fuel rod using the above described apparatus according to the present invention is described below.

First, as shown in FIG. 3, the fuel pellets 1 are arranged in a plurality of rows by the barrier rib 12 of the tray 10 to be transferred.

A first step is measuring the length of the fuel pellets in a unit of row, wherein the fuel pellets are arranged in a plurality of rows on the tray 10.

Meanwhile, in order to accurately measure the length of the fuel pellets, a process of exactly aligning the fuel pellets 1 arranged on the tray 10 prior to the measurement process may be added.

The process of aligning the fuel pellets 1 may be performed by the fuel pellet alignment unit 120, and specifically, as shown in FIGS. 4 and 5, when the tray is transferred along the main transfer unit 112 and stopped at a particular position in which the alignment unit 120 is located so that the cylinder load 121a presses the fuel pellet on the tray 10 to be closely positioned on the fixing plate 13.

When alignment of the fuel pellet 1 is completed, the flat image information of the tray 10 is obtained by the camera 131. The image information is transmitted to the controller 140 to calculate the length of a row of the fuel pellets arranged in the tray 10 by processing the image and store the calculated value.

This process is equally performed on each transferred tray 10 and the length of the fuel pellet row of the tray 10 is calculated to be accumulated.

A second step is comparing the length of the fuel pellet row as accumulated in the above manner with the set charging length of the cladding tube.

A third step is comparing the accumulated length of the measured fuel pellets in a unit of row with the set fuel pellet charging length of the cladding tube and adding or subtracting the fuel pellet to/from a corresponding row of the fuel pellet such that a difference between the two is smaller than a length of a unit fuel pellet.

The addition and/or subtraction of the fuel pellet 1 on the tray 10 is performed by the fuel pellet waiting table 150 and the pellet transfer unit 160. Specifically, as shown in FIGS. 9 and 10, when the measured entire length of a particular row of fuel pellets on the tray 10 is greater than the set charging length, the fuel pellet 1 is moved from a corresponding row on the tray 10 to the waiting table 150 by the vacuum nozzle 164*a* located at the corresponding row, and when a particular row does not have sufficient fuel pellets on the tray 10, the fuel pellet 1*a* is moved from the waiting table 150 to the tray 10 such that a difference between the set fuel pellet charging length and the detected entire length of the fuel pellets on the tray 10 is less than a unit length L0 of the fuel pellet.

For example, when the fuel pellet charging length of the cladding tube set for a first row of the tray 10 is 4000 mm and an average unit length L0 of the fuel pellet is 10 mm, in a case where the entire length of the fuel pellet of a first row that is detected and accumulated for a plurality of trays 10 is 3985 mm, the controller 140 may control to move one fuel pellet 1*a* from the fuel pellet waiting table 150 to the first row of the tray 10 such that the entire length of the fuel pellets in the first row becomes 3995 mm and the fuel pellets needed for charging the cladding tube are determined within a unit length 10 mm of the fuel pellet.

Similarly, when the cumulative total length of fuel pellets that is detected to exceed the charging length of the fuel pellet, the fuel pellet can be moved from the corresponding row to the fuel pellet waiting table 150, thereby tailoring the number of the fuel pellets to the charging length.

Thus, the fuel pellets that correspond to the set length of the cladding tube are stacked within the tray rack 20 by the tray loading unit 170 in a unit of the tray and are finally charged in the cladding tube and manufactured into the nuclear fuel rod.

As described above, the apparatus for automatically loading the fuel pellet for manufacturing the nuclear fuel rod includes a tray transfer unit configured to horizontally transfer a tray in which a plurality of fuel pellets are arranged; a fuel pellet alignment unit configured to align the fuel pellets arranged in the tray; a measurement unit configured to measure an entire length of the fuel pellets arranged in a row on the tray; a controller configured to store the length of the fuel pellets measured by the measurement unit, configured to compare a measured length that is accumulated with a set length, and configured to control driving of driving elements; and a waiting table located adjacent to the tray transfer unit to store a redundancy fuel pellet; and a fuel pellet movement unit configured to be driven by the controller and configured to move the fuel pellet between a tray of which length measurement is completed by the measurement unit and the waiting table to increase or decrease the fuel pellet arranged on the tray. Therefore, a required number of fuel pellets is calculated according to the charging length needed for the cladding tube charging process and the fuel pellets are automatically loaded in a unit of tray, thereby improving workability and productivity in manufacturing the nuclear fuel rod.

In the above, although the embodiments of the present invention have been described with reference to the accompanying drawings, a person skilled in the art should apprehend that the present invention can be embodied in other specific forms without departing from the technical spirit or essential characteristics thereof. Thus, the embodiments described above should be construed as exemplary in every aspect and not limiting.

What is claimed is:

1. A method for automatically loading fuel pellets for manufacturing a nuclear fuel rod, the method comprising:
   arranging fuel pellets in a row spanning a plurality of trays, the fuel pellets arranged in a plurality of sub rows of fuel pellets, each sub row of the fuel pellets being arranged on a respective one of the plurality of trays;
   aligning the fuel pellets in the row such that the fuel pellets arranged on each of one of the plurality of trays are closely in contact with one another;
   measuring a respective length of each sub row of the fuel pellets on each tray;
   adding the respective length of each sub row one after another for all of the plurality of trays, and obtaining a total length of the fuel pellets in the row spanning the plurality of trays;
   comparing the total length of the fuel pellets with a preset fuel pellet charging length of the nuclear fuel rod; and
   when the total length is smaller than the preset fuel pellet charging length and a difference between the total length and the preset changing length is greater than an average unit length of the fuel pellets, adding one or more fuel pellets in the row such that the total length of the fuel pellets on the plurality of trays is increased to an extent that said difference becomes smaller than the average unit length of the fuel pellets.

2. The method according to claim 1, wherein said measuring is performed using an optical flat image of the tray.

3. The method according to claim 1, further comprising:
   providing a fuel pellet waiting table and a pellet transfer unit,
   wherein said one or more fuel pellets are added, such that said one or more fuel pellets are moved from the fuel pellet waiting table by the pellet transfer unit to one of the trays.

4. A method for automatically loading fuel pellets for manufacturing nuclear fuel rods, the method comprising:
   arranging fuel pellets in rows on a plurality of trays, wherein the rows include first to Nth rows, N being a positive integer, each of the rows spanning on the plurality of trays, the fuel pellets in each of the rows arranged in a plurality of sub rows of fuel pellets, each sub row of the fuel pellets in each of the rows being arranged on a respective one of the plurality of trays;
   aligning the fuel pellets in each of the rows such that the fuel pellets arranged on each row in each of the plurality of trays are closely in contact with one another;
   measuring a length of each sub row of the fuel pellets on each tray respectively for the first to Nth rows;

adding the length of each sub row for all of the plurality of trays respectively for the first to Nth rows, and obtaining first to Nth total lengths of the fuel pellets in each of the first to Nth rows spanning the plurality of trays;

comparing the first to Nth total lengths of the fuel pellets respectively with a preset fuel pellet charging length of a corresponding one of the nuclear fuel rods; and when the total length of the fuel pellets in one of the first to Nth rows is smaller than the preset fuel pellet charging length and a difference between the total length of the fuel pellets in said one of the first to Nth rows and the preset fuel pellet charging length is greater than an average unit length of the fuel pellets, adding one or more fuel pellets to be arranged in said one row such that the total length of the fuel pellets in said one of the first to Nth rows on the plurality of trays is increased to an extent that said difference becomes smaller than the average unit length of the fuel pellets.

5. The method according to claim 4, wherein said measuring is performed using an optical flat image of the tray.

6. The method according to claim 4, further comprising:
providing a fuel pellet waiting table and a pellet transfer unit,
wherein said one or more fuel pellets are added, such that said one or more fuel pellets are moved from the fuel pellet waiting table by the pellet transfer unit to one of the trays.

* * * * *